March 27, 1956   A. L. DITTMAN   2,739,960
MANUFACTURE OF PERHALOCARBON POLYMERS
Filed Dec. 12, 1950
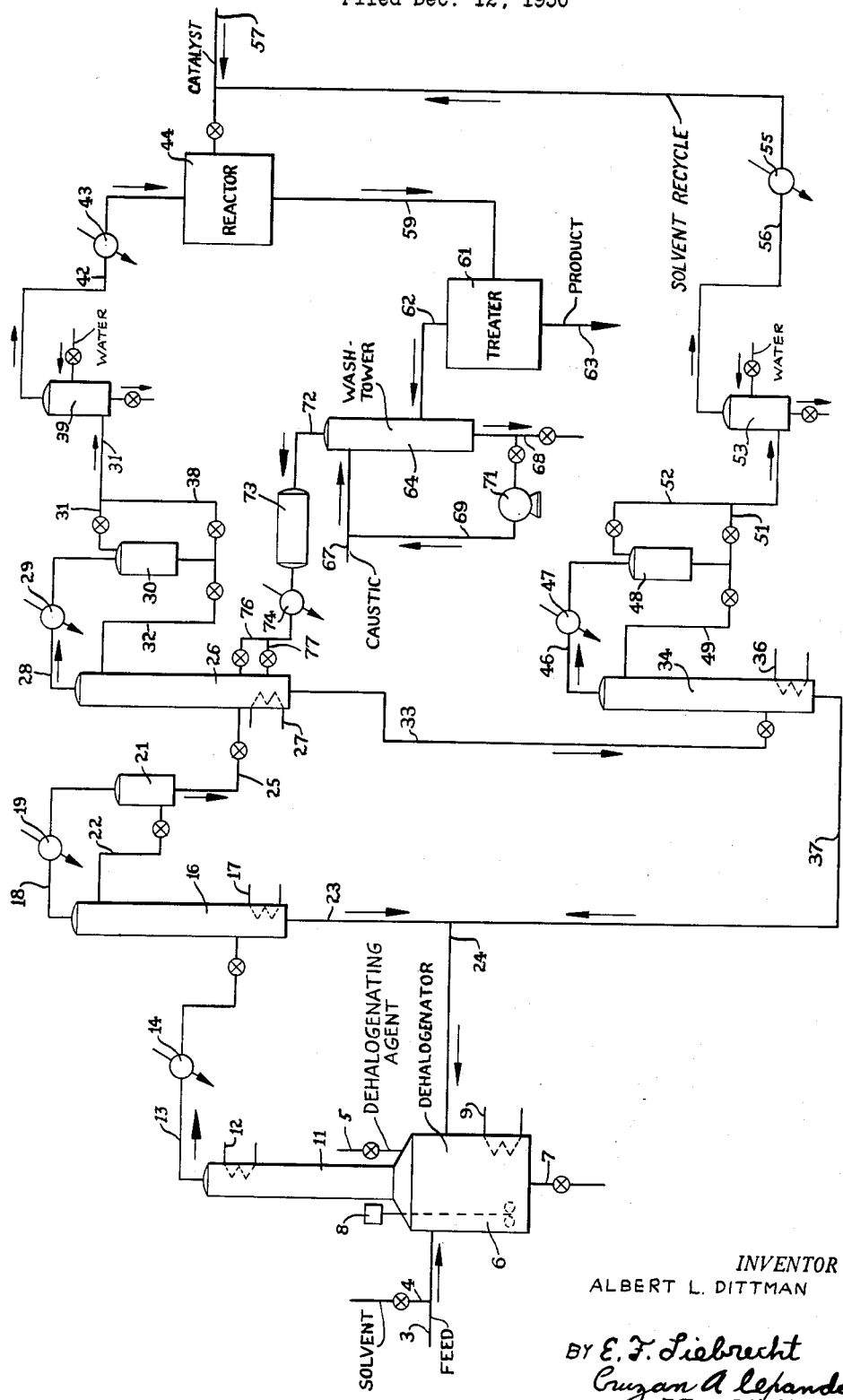
*INVENTOR*
ALBERT L. DITTMAN
BY E. F. Siebrecht
Cruzan A. Lepander
*ATTORNEYS*

_United States Patent Office_

2,739,960
Patented Mar. 27, 1956

2,739,960

MANUFACTURE OF PERHALOCARBON POLYMERS

Albert L. Dittman, Jersey City, N. J., assignor to M. W. Kellogg Company, Jersey City, N. J., a corporation of Delaware Application December 12, 1950, Serial No. 200,452

10 Claims. (Cl. 260—92.1)

This invention relates to the manufacture of perhalocarbons. In one of its aspects, this invention relates to the polymerization of perhalo-olefins. In another more particular aspect this invention relates to a process for the polymerization of perfluorochloro-olefins, such as trifluorochloroethylene, under polymerization conditions to produce halocarbons of higher molecular weight than the monomer, such as polytrifluorochloroethylene. In the latter aspect the invention relates particularly to the purification of the trifluorochloroethylene monomer prior to polymerization thereof to produce normally solid and liquid polymers of high chemical and physical stability.

The polymerization of perfluorochloro-olefins which are relatively free from contaminants produces a variety of useful products. For example, the polymerization of substantially pure trifluorochloroethylene under suitable conditions produces dimers, trimers, relatively low molecular weight polymers in the oil and grease range, and normally solid polymers, including acyclic and alicyclic compounds. In the high molecular weight range the solid polymers are characteristic of a plastic. In general, these polymers have great physical and chemical stability, particularly as regards resistance to oxidation and attack by acids. The polymers contain only negligible amounts, if any, of such elements as hydrogen and oxygen. These polymers are also much more stable than the corresponding perchlorocarbons. As is obvious from their physical and chemical characteristics, such perhalopolymers produced from the perfluorochloro-olefins are useful for many purposes.

The object of this invention is to provide a continuous process for the polymerization of perhalo-olefins.

Another object of this invention is to provide a process for the manufacture of polytrifluorochloroethylene.

It is still another object of this invention to produce normally liquid and solid polymers of perhalocarbons, particularly plastic polymers.

A further object of this invention is to provide a process for the production of perhalo-polymers containing negligible amounts of impurities, such as hydrogen and oxygen.

It is still a further object of this invention to provide a method for purifying the monomer.

Various other objects and advantages of the present invention will become apparent to those skilled in the art from the accompanying description and disclosure.

As herein employed, "perhalocarbons" are defined as compounds consisting substantially exclusively of carbon and halogen with any degree of saturation. "Perfluorochloro-olefin" is defined as a perhalocarbon, particularly a perhalo-olefin with any degree of unsaturation, consisting of fluorine, carbon, and, as regards this invention, not more than one chlorine atom per atom of carbon.

In accordance with this invention a saturated perhalocarbon is dehalogenated under suitable conditions of dehalogenation in the presence of a solvent and a metallic dehalogenating agent to produce a perfluorochloro-olefin, which is the monomer for the subsequent polymerization reaction. The solvent should be substantially completely miscible with the perhalocarbon to be dehalogenated and, when a metal dehalogenating agent is used, also capable of dissolving the metal halide formed by the dehalogenation reaction. The boiling point of the solvent should be higher than the boiling point of the perhalo-olefin produced by the dehalogenation treatment. Such a solvent is an alcohol, preferably methyl alcohol or ethyl alcohol. An effluent comprising the desired perhalo-olefin monomer including unreacted saturated halocarbon and solvent is passed to a fractional distillation system in which substantially pure perhalo-olefin is recovered as a relatively low-boiling fraction and unreacted saturated perhalocarbon and solvent are recovered as higher-boiling products. The higher-boiling products comprising unreacted saturated halocarbon and solvent are returned to the dehalogenation reaction. A perhalo-olefin overhead product substantially free from saturated perhalocarbons but containing a small amount of solvent is passed continuously or intermittently through a water wash or scrubber to remove solvent and thence to a polymerization zone in which the perhalo-olefin monomer is polymerized under suitable polymerization conditions, and, in some instances, in the presence of a suitable catalyst or promoter. When a solid promoter material is used, a solvent may be employed to dissolve the promoter in order to facilitate handling and mixing with the monomer. In some types of polymerizations to be more fully discussed hereinafter, a liquid chain transfer agent or solvent is employed to advantage during the polymerization. To aid in the separation and recovery of such chain transfer solvents from the polymerization product, it is preferred that they be lower-boiling than or at least partially immiscible with the polymeric product produced by the polymerization reaction and higher-boiling than the monomer.

After the desired extent of polymerization, the resulting polymerization reaction mixture is removed from the polymerization zone and treated to recover the polymeric product of the perhalo-olefin and to remove any solvent and unreacted monomer. Recovered solvent and monomer are returned to the fractional distillation system, if desired. In the fractional distillation system, solvent used in polymerization reaction, such as for dissolving the promoter or as a chain transfer agent, is separated and returned to the polymerization reaction zone.

For a better understanding of the present invention, reference will be made to the accompanying drawing which diagrammatically illustrates an arrangement of apparatus for the production of perhalopolymers. The drawing will be described with reference to the production of polytrifluorochloroethylene polymers from trichlorotrifluoroethane, but the process of the drawing may be applied to the production of other perhalo-polymers from other perhalo-olefins without departing from the scope of this invention. The principal pieces of apparatus of the present invention comprises a dehalogenator 6, a polymerization reactor 44, and various purification and separation equipment for purifying and separating materials utilized and produced.

According to the drawing and the process illustrated, trichlorotrifluoroethane of the 1,2,2-chloro-structure, which may be obtained commercially on the open market as Freon 113, is continuously passed through conduit 3 to dehalogenator 6. A metallic dechlorinating agent, such as zinc dust, is continuously or intermittently introduced through conduit 5 into reactor 6. Although zinc is preferred, various dechlorinating agents may be used, such as tin, magnesium, and iron, without departing from the scope of this invention. Fresh solvent for dissolving metal halide formed in dehalogenator 6 and of the general characteristics previously discussed is continuously or intermittently introduced into feed conduit 3 through conduit 4 or alternatively directly into dehalogenator 6 by means not shown. In this discussion the solvent used in the dechloroination of trichlorotrifluoroethane is a low-boiling alcohol, e. g. methyl alcohol. The amount of metal dechlorinating agent introduced into dehalogenator 6 is equivalent to at least the theoretical amount necessary for removal of two halogen atoms from the halocarbon. Preferably, an excess dechlorinating agent is used in effecting the dechlorinating reaction and the excess may be as much as 100 per cent or more. It is desirable to have an amount of solvent equivalent in weight to the perhalocarbon charged, but the amount may vary depending upon the reaction conditions, the quantity generally being less for superatmospheric than for atmospheric pressures, a suitable quantity for operation at atmospheric pressure being 65 per cent of the weight of the perhalocarbon charged. The mixture of perhalocarbon and solvent is vigorously agitated by means of a conventional mechanical stirrer 8 to suspend the metal dechlorinating agent in the liquid mixture in the lower portion of reactor 6. Required temperatures are maintained in the liquid phase of dehalogenator 6 by conventional means, such as heating or cooling coils 9 or a jacket through which a heat exchange medium is passed at the desired temperature. For temperature below about 0° C., a light naphtha may conveniently be used. Water may be used for higher temperatures. Outlet conduit 7 is used for discharging the contents of dehalogenator 6.

For the dechlorination of trichlorotrifluoroethane to trifluorochloroethylene, pressures between atmospheric and about 300 or 400 pounds per square inch gage are employed, preferably a pressure between about 120 and 200 pounds per square inch gage, and a particularly suitable pressure is about 180 pounds per square inch gage. In the preferred form of the invention, the pressure should be sufficiently low at any given temperature to permit vaporization of the trifluorochloroethylene from the liquid phase in dehalogenator 6 without substantial vaporization of the other constituents of the reaction mixture. A suitable temperature for the dehalogenation is between about 0° C. and 200° C. It is preferred to use a temperature between about 40° C. and about 150° C., usually about 115° C. for operation at 180 pounds per square inch gage. At the higher temperatures the rate of reaction is increased, which in most instances is desirable. However, excessive temperatures cause undesirable side reactions.

In starting up the dehalogenation reaction a small proportion of a metal halide, such as zinc chloride, is introduced into dehalogenator 6 to promote or start the dehalogenation reaction. The metal halide may be introduced separately, or in admixture with the dechlorinating agent through conduit 5.

Suitable solvents or diluents for the dehalogenation step comprise the water soluble alcohols methyl, ethyl, n-propyl, and n-butyl alcohols; dioxane, glycerol, butyl carbitol, and the cellosolves. Other known solvents complying with the general requirements may be used, if desired, without departing from the scope of this invention. As stated, the preferred solvents are methyl alcohol and ethyl alcohol.

Since the temperature and pressure conditions which are maintained in dehalogenator 6 according to the preferred embodiment of this invention are such that the perhalo-olefin formed therein as the desired product is vaporized, the olefin passes upward (through a rectification column 11) together with saturated perhalocarbons and alcohol solvent as the result of entrainment and the formation of azeotropes. The major proportion of the perhalocarbon and solvent are retained in the liquid phase in dehalogenator 6. The upper portion of the rectification column 11 is maintained at a temperature substantially lower than the temperature of the liquid phase of dehalogenator 6, preferably at least 20° C. lower. The top temperature of column 11 is maintained at the desired level by indirect heat exchange means 12 or by refluxing a portion of liquefied overhead product. In rectification column 11, some of the methyl alcohol solvent and trichlorotrifluoroethane are condensed and flow downward back into dehalogenator 6, while the monomer is removed therefrom through conduit 13. Since the rectification column 11 effects only a partial separation, the vaporous stream in conduit 13 will contain unremoved saturated perhalocarbon and solvent; e. g. trichlorotrifluoroethane and methyl alcohol.

A typical composition of the trifluorochloroethylene-containing stream in conduit 13 is shown below in Table I for operation of dehalogenator 6 at superatomspheric pressure and rectification column 11 at a top temperature of about −20° C. Usually this stream will contain from about 5 to about 25 volume per cent alcohol depending upon the amount, if any, rectification employed. The alcohol is present because of entrainment and azeotropic formation with the monomer.

*Table I*

| | Vol. per cent |
|---|---|
| Monomer | 64 |
| Methyl alcohol | 15 |
| $C_2F_3Cl_3$ | 20 |
| Other material | 1 |
| | 100.0 |

The monomer-containing stream is passed through conduit 13 to a cooler 14, wherein it is liquefied, and thence to a fractional distillation column 16. As previously mentioned, a portion of the liquefied effluent in conduit 13 may be returned by means not shown to the upper portion of rectification column 11 as liquid reflux therefor to aid in maintenance of the required top temperature.

The subsequent fractional distillation of the effluent in conduit 13 is an important feature of the process of this invention since the purification of the monomer trifluorochloroethylene by the removal of the alcohol solvent and saturated perhalocarbon is essential in order to obtain satisfactory yields and reproducible results in the polymerization effected in reactor 44. To effect the purification of the monomer, liquid from conduit 13 is introduced into fractional distillation column 16. This column is maintained at a temperature and pressure corresponding to that required to pass monomer overhead and to recover the solvent and unreacted saturated perhalocarbon as a bottoms product. If superatmospheric pressures are employed during the dehalogenation in unit 6, the pressure of the liquid in conduit 13 may be decreased upon introduction into distillation column 16 to aid in the fractional distillation and lower the temperatures required therein. A top temperature of about −20° C. is appropriate for atmospheric distillation in column 16. Indirect heat exchange element 17 is provided in the lower portion of column 16 as a means for controlling the temperature of the bottoms product, which is about 15° C. at atmospheric pressure. Element 17 may comprise an internal coil within column 16 or a conventional external reboiler. Upon distillation, the monomer is removed from column 16 through conduit 18 together with a relatively minor proportion of unremoved saturated halocarbon and also methyl alcohol. The methyl alcohol is usually present in this stream in an amount between about 1 and about 10 volume per cent. The vaporous effluent is passed through conduit 18 to a conventional cooler or condenser 19 wherein the effluent is condensed. From cooler 19, the effluent is passed to an accumulator 21 in which condensate is collected. A portion of the condensate is returned to column 16 through conduit 22 as liquid reflux therefor. Internal cooling means (not shown) may be positioned within the upper portion of column 16 to aid in refluxing of the distillation column and may be used in addition to, or alternatively to, condensate returned through conduit 22.

The bottoms product from distillation column 16 is removed therefrom through outlet conduit 23 and is returned by means of a pump (not shown) through conduits 23 and 24 to dehalogenator 6. The bottoms product comprises the major proportion of the solvent and saturated perhalocarbon in the monomer-containing stream of conduit 13.

A typical analysis of the overhead and bottoms product for column 16 when operated at a top temperature of about −20° C. and a kettle temperature of about 15° C. at atmospheric pressure is shown in Table II below:

Table II

| Overhead: | Volume percent |
|---|---|
| Monomer (trifluorochloroethylene) | 82 |
| Methyl alcohol | 3 |
| $C_2F_3Cl_3$ | 14 |
| Other material | 1 |
| | 100 |
| Bottoms product: | |
| Methyl alcohol | 73 |
| $C_2F_3Cl_3$ | 25 |
| Other material | 2 |
| | 100 |

A portion of the stream in conduit 23 may be discarded by means not shown when the solvent has become substantially saturated and/or in order to prevent the build-up of contaminants in the system, such as by-products and polymers formed during the dehalogenation. Liquid can also be withdrawn directly from dehalogenator 6 through outlet conduit 7 for the above purpose.

In some instances it may be desirable to use a soluble stabilizer or inhibitor to prevent oxidation and/or polymerization of the monomer during distillation and storage. Such soluble inhibitors comprise a tertiary amine or terpene.

Condensate from accumulator 21 is passed through conduit 25 to a second fractional distillation column 26 in which solvent and unreacted perhalocarbon are removed from the monomer. In column 26 the control of temperature and pressure conditions is more selective than in column 16 in order to make a closer cut between the monomer and the undesired components, such as the solvent and saturated perhalocarbon. The temperature and pressure are selected such that the monomer is removed overhead through conduit 28 and is passed through a cooler 29 to an accumulator 30. Condensate at a temperature of about −28° C. is returned to the top of column 26 through conduit 32 as reflux. Methyl alcohol solvent and saturated perhalocarbon are removed as a bottoms product through an outlet conduit 33. When operating at approximately atmospheric pressure the top temperature of column 26 is about −26° C. and the kettle temperature of column 26 is about −20° C. Element 27 comprises a conventional heat exchange means, such as an internal coil or an external reboiler, for maintaining the desired temperature at the bottom of column 26. A refrigerant, such as a light naphtha, is circulated through coils 27 at about −15° C. Solvent and unreacted monomer from reactor 44 which have been separated from the polymer product in treater 61 are introduced into the lower portion of column 26 through conduits 76 and 77. The solvent used in the polymerization for either dissolving the polymerization promoter or as a chain transfer agent and its recovery will be discussed more fully hereinafter. Since the polymerization solvent is also higher-boiling than the monomer, it is removed with the bottoms product through outlet conduit 33. When trifluorochloroethylene is polymerized at a low temperature to produce a normally solid polymer, an organic peroxide dissolved in trichlorofluoromethane is employed as a promoter. A chain transfer agent is used when polymerizing at a higher temperature to produce a polymer oil.

For operating distillation column 26 at a top temperature of about −25° C. and at a kettle temperature of about −20° C. at atmospheric pressure and for low temperature polymerization to produce a solid polymer, a typical composition of the overhead and bottoms streams is shown in Table III below:

Table III

| Overhead: | Volume percent |
|---|---|
| Monomer | 99+ |
| Other materials, such as $C_2F_3Cl_3$, $CCl_3F$, and traces of methyl alcohol and water | >0.005 |
| | 100 |
| Bottoms product: | |
| $C_2F_3Cl_3$ | 41 |
| $CCl_3F$ | 43 |
| Methyl alcohol | 5 |
| Other material | 1 |
| | 100 |

The amount of methyl alcohol in the overhead is small but in substantial excess of 100 p. p. m. and enough to affect the quality of the polymerization product.

The liquid bottoms product from distillation column 26 continuously passes through conduit 33 to a third fractional distillation column 34 in which the solvent used in the polymerization step, such as $CCl_3F$, is separated from saturated perhalocarbon ($C_2F_3Cl_3$) and solvent (methyl alcohol) used in the dehalogenation reaction. Temperature and pressure conditions of distillation column 34 are such that trichlorofluoromethane is passed overhead while trichlorotrifluoroethane and any remaining methyl alcohol are removed as a bottoms product. When using atmospheric pressure in distillation column 34, the kettle temperature will be about 48° C. and the overhead temperature will be about 27° C. for separating trichlorofluoromethane from trichlorotrifluoroethane. For superatmospheric pressures higher temperatures are used. The trichlorotrifluoroethane-containing bottoms product is removed from column 34 through outlet conduit 37 and is continuously returned by means of a pump (not shown) through conduit 24 to dehalogenator 6. Element 36 is a conventional heat exchange means, such as an internal coil or external reboiler, for controlling the kettle temperature of distillation column 34. The overhead product comprising trichlorofluoromethane and less than about one per cent of the other components of the feed but more than 100 p. p. m. of methyl alcohol is removed from column 34 through conduit 46, a portion of which overhead may be condensed in a conventional cooler 47 and returned through conduit 49 to the upper portion of column 34 as reflux therefor. The treatment of the overhead product of column 34 and its return to reactor 44 will be discussed more fully subsequently.

The overhead product from the second distillation column 26 in conduit 28 comprises the monomer and contains traces of contaminants, such as methyl alcohol from the dechlorination step. This vaporous stream in conduit 28 is passed through a conventional cooler 29 in which the vapors are cooled and condensed and resulting condensate is passed from cooler 29 to an accumulator 30. Condensate which is collected in accumulator 30 is returned through conduit 32 to the upper portion of distillation column 26 as liquid reflux for controlling the top temperature thereof. Alternatively or in addition to refluxing with condensate from conduit 32, internal cooling means (not shown) may be positioned within the upper portion of column 26 for causing internal refluxing.

Before the distilled monomer is polymerized in reactor 44, the monomer must be further purified to remove substantially all traces of the solvent employed in the dechlorination step. It has been discovered that quantities of solvent, such as methyl alcohol, in the monomer greater than 100 p. p. m. seriously retards the polymerization and produces an inferior polymer. It has further been discovered that water washing the monomer will remove substantially all of the solvent leaving the methyl alcohol solvent in the monomer substantially less than the maximum 100 p. p. m. tolerable. The presence of small amounts of water in the monomer does not affect the polymerization thereof, nor the quality of the polymer product. Table IV below shows the concentration of methyl alcohol after water washing of the monomer trifluorochloroethylene for various ratios and quantities of water and monomer:

Table IV

| Run No. | $CH_3OH$, gm. | $H_2O$, gm. | $CFCl-CF_2$, gm. | p. p. m. $CH_3OH$ After Water Wash |
|---|---|---|---|---|
| 1[1] | 6.4 | 500 | 650 | |
|   |     | 500 |     | 0 |
| 2 | 7.0 | 703 | 700 | 15 |
| 3 | 8.6 | 760 | 742 | 20 |

[1] Double wash.

The distribution coefficient of methyl alcohol between water and monomer is very large and is approximately 500.

As previously stated, the effluent from distillation column 26 contains a small amount of alcohol as the result of a low-boiling azeotropic formation with the monomer trifluorochloroethylene. The higher the temperature of distillation, the greater is the percentage of alcohol in the low-boiling azeotrope. In order to remove this last trace of solvent, the distilled monomer is passed from distillation column 26 to an absorber 39 for either liquid-liquid or liquid-vapor contact with water in the conventional manner. Suitable conditions of water wash include a pressure between atmospheric and about 500 pounds per square inch gage depending upon the manner of operation and temperatures employed, and a temperature between about 25° C. and about 100° C., preferably above 50° C. Water washing under these preferred conditions with excess water will reduce the methyl alcohol content to less than about 25 p. p. m. or lower. If only that much of the vapors in conduit 28 are condensed as to provide reflux to column 26, the remaining vapors are removed from accumulator 30 through conduit 31 and are passed through absorber to remove the methyl alcohol.

To treat the monomer stream in the liquid condition in absorber 39, cooler 29 is operated such that substantially the entire effluent stream in conduit 28 is condensed. Condensate from accumulator 30 is then passed through conduit 38 to absorber 39. In this modification, cooler 43 may be omitted; however, cooler 43 may be used to further cool the condensate to the desired polymerization temperature after passage through absorber 39 without departing from the scope of this invention.

In reactor 44 polymerization of the perfluorochloro-olefin monomer is effected under suitable conditions of polymerization with or without the presence of suitable promoter materials. According to one embodiment of this invention, trifluorochloroethylene is polymerized in the presence of an organic peroxide promoter to a normally solid polymer having good physical and chemical characteristics. A particularly suitable promoter for this embodiment of the invention comprises bis-trichloroacetyl peroxide. The amount of trichloroacetyl peroxide used varies between about 0.01 and about 0.50 per cent of the monomer in the reaction mixture for the solid polymer product. In general, the concentration of promoter depends upon the desired product of the process and by increasing the concentration of promoter a decrease in molecular weight of the resulting polymer is obtained.

Bis-trichloroacetyl peroxide may be prepared by reacting sodium peroxide with trichloroacetyl chloride at a temperature of about −15° C. The bis-trichloroacetyl peroxide product is extracted from the resulting mixture with trichlorofluoromethane. The bis-trichloroacetyl peroxide is recovered from the trichlorofluoromethane by crystallization.

Various other organic peroxides, such as trifluoroacetyl peroxide, difluorochloroacetyl peroxide, 2,4 dichlorobenzoyl peroxide, bis-trifluorochloropropionyl peroxide, chloroacetyl peroxide and dichlorofluoro-acetyl peroxide have been found capable of promoting the polymerization reaction to produce a solid or plastic polymer.

When a peroxide promoter is used for polymerization at low temperatures to produce a solid polymer, it is desirable to dissolve the promoter in a suitable solvent since the promoter is a solid. According to the process illustrated, such solvent should have a boiling point below the boiling point of the polymer product and higher than the boiling point of the monomer. The solvent should also be miscible with the perhalo-olefin feed to reactor 44. The quantity of solvent containing the promoter employed is preferably between about 1 and about 20 per cent of the olefin feed but larger or smaller amounts may be used without departing from the scope of this invention. Preferably, the solvent used for the catalyst in the polymerization of trifluorochloroethylene to a solid polymer is trichlorofluoromethane.

The promoter is introduced into reactor 44 through conduit 57 after being admixed with fresh or recycled solvent from conduit 56. For the production of a normally plastic polymer, a preferred temperature between about −20° C. and about 100° C. is employed depending upon the catalyst and operating conditions used. When using bis-trichloroacetyl peroxide as the catalyst for the production of a solid polymer, temperatures between about −20° C. and about 30° C. are appropriate. Any pressure up to that at which decomposition becomes appreciable may be employed. At the higher pressures, higher temperatures may be employed, which decreases the time required for the polymerization of the trifluoroethylene. It is preferred, therefore, to operate at superatmospheric pressures in excess of about 50 pounds per square inch gage. At a temperature of about −16° C. and atmospheric pressure, approximately seven days of residence time is required for an economical yield of solid polymer. At elevated temperatures and at superatmospheric pressures, a residence time of minutes or seconds is sufficient to obtain an economic yield of polymer.

The primary purpose of the trichlorofluoromethane solvent in the production of solid polymers as described heretofore is for dissolving the solid organic peroxide promoter in order to assure intimate contact between monomer and promoter and in order to facilitate handling of the catalyst. Solvents of this type useful as promoter solvents comprise carbon tetrachloride, difluorodichloromethane, bromotrichloromethane, trifluorochloromethane, 1,2,2, tetrachloroethane, pentafluorochloroethane, trichlorotrifluoroethane, dichloroperfluorocyclobutane, and perfluoroheptane.

The solid polymer produced under the preferred operating conditions of this invention and with a trifluorochloroethylene monomer containing less than 100 p. p. m. of methyl alcohol solvent is characterized because of its ability to maintain its hardness, toughness and resiliency at temperatures above 100° C. and as high as about 200° C. to 350° C.

For effecting thermal polymerization reactions in reactor 44 without a catalyst or with a relatively less active catalyst, relatively high temperatures and pressure are required. Temperatures as high as 600° C. or higher and pressures as high as 30,000 pounds per square inch gage are within the scope of this invention, particularly for use in thermal polymerization. The time required for thermal polymerization, as with catalytic polymerization, varies with the conditions and desired product.

In the polymerization of a chlorofluoro-olefin to produce polymer oils, a solvent of the chain transfer type and benzoyl peroxide as the promoter are used. Solvents of this type useful as chain transfer agents comprise carbon tetrachloride, chloroform, and trichloroethylene. Other organic peroxides may also be utilized as promoters in the production of polymer oils. Inorganic promoters, such as the persulfates, peroxides and the perborates may also be used without departing from the scope of this invention. With the inorganic promoters water is used as a solvent and diluent. In general, higher temperatures are used than in the production of a solid product, severally 20° C. to 200° C.

Reactor 44 may comprise a steel bomb surrounded by a suitable heat exchange medium, such as a light naphtha or water, for maintaining the temperature substantially constant during the polymerization reaction. Alternatively, especially for the production of polymer oil, the reactor may comprise tubes or coils surrounded with the heat exchange medium for maintaining the temperature at the desired level and through which the reaction mixture is continuously passed. The length of the tubes or coils are such that with respect to the rate of flow of the reactants sufficient residence time is allowed for an economic yield of product.

When a bomb type reactor is used for polymerization, several reactors are used so that the polymerization step of the process may be continuous. For example, while one reactor is being charged or the polymerization reaction effected, another bomb is heated to evaporate solvent and unreacted monomer, such as in treater 61.

The polymerization product is removed from reactor 44 and passed by a conventional conveying means 59 to treater 61. In treater 61 the polymerization product is heated to evaporate solvent and unpolymerized monomer therefrom. Polymerization product, such as a solid polymer, is recovered from treater 61 at 63 as a product of the process. When the polymerization product is an oil, treater 61 may comprise a settling zone as well as evaporation means for separating immiscible components from the polymer oil. The evaporated solvent and monomer are passed from treater 61 through conduit 62 to wash tower 64. In wash tower 64 the gaseous stream from conduit 62 is passed upwardly therethrough in contact with a downflowing caustic solution, such as a sodium or potassium hydroxide solution. Impurities, such as acids resulting from the polymerization reaction including trichloroacetic acid, phosgene and their derivatives, are neutralized in wash tower 64 and removed with the wash effluent through conduit 68. A portion of the caustic wash may be recycled by means of pump 71 and conduit 69 to the upper portion of wash tower 64. Fresh caustic solution is introduced into wash tower 64 through conduit 67. The wash tower is maintained substantially at those conditions previously discussed with regard to water washing. Vapors of solvent and monomer substantially free from acidic contaminants but containing entrained caustic solution are passed from wash tower 64 through conduit 72 to absorber 73. In absorber 73 the last traces of caustic solution are removed with a suitable material, such as sodium sulfate, calcium sulfate, manganese sulfate, calcium chloride, and bauxite, or mixtures thereof. From absorber 73, vapors are passed through a cooler 74 in which the vapors are condensed. From cooler 74, the condensate is passed through conduits 76 and 77 to the lower portion of fractional distillation colum 26, as previously discussed. Absorber 73 may be omitted, if desired, without departing from the scope of the invention.

The solvents, such as trichlorofluoromethane and between about 1 and about 10 volume per cent methyl alcohol, are removed from distillation column 26 with the bottoms product through outlet conduit 33 and is passed to a third distillation column 34, as previously discussed. In column 34 the solvent for the polymerization reaction is continuously recovered as an overhead product containing less than about 0.005 volume per cent but more than 100 p. p. m. of methyl alcohol and is passed through conduit 46 to a conventional cooler 47 in which at least a portion of the vaporous overhead is condensed. Condensate is then passed to an accumulator 48. Condensate from accumulator 48 is returned to the upper portion of column 34 through conduit 49 as liquid reflux therefor. When the entire overhead is condensed in cooler 47, condensate is passed from accumulator 48 through conduit 51 to absorber 53 to remove oxygen-containing compounds. When only the amount of overhead required for reflux is condensed, uncondensed overhead is passed through conduit 52 to absorber 53. As with respect to absorber 39, absorber 53 is operated similarly for removal of traces of the methyl alcohol solvent which inhibits the polymerization reaction by water washing. Substantially pure solvent, such as trichlorofluoromethane, containing less than 100 p. p. m. of methyl alcohol is returned to reactor 44 through conduits 56 and 57.

The polymer product recovered at 63 may be subjected to further treatment, such as fluorination, pyrolysis, filtration, fractionation of polymer oils by distillation or solvent extraction, etc., without departing from the scope of this invention.

The amount of water in the monomer stream after water washing is usually small, less than about 150 p. p. m., and does not materially affect the polymerization. The presence of water, however, may increase the corrosion problems. In order to remove the water after water washing, the monomer stream may be contacted with a suitable absorbent, such as calcium sulfate, phosphorous pentoxide, silica gel, and activated charcoal.

In the storage of the monomer as a liquid, a blanket of nitrogen is maintained over the liquid phase in order to prevent contact between monomer and an oxidizing atmosphere.

As the process of this invention can be applied to the polymerization of other perhalo-olefins whose physical and chemical characteristics lend themselves to the invention described, the specific examples of conditions, reactants and materials described with reference to the drawing should not be construed as limiting to the invention. Various modifications and alterations of the equipment, such as the elimination of either distillation columns 16 or 26, and/or distillation column 34, may be practiced without departing from the scope of this invention. Certain pieces of apparatus and auxiliary equipment, such as liquid level controls, temperature and pressure controls, valves, pumps, coolers or condensers, and storage facilities have been omitted from the drawing as a matter of convenience and clarity. The water washing step may precede either distillation column 16 or column 26 without departing from the scope of this invention.

Having described my invention, I claim:

1. A process for the production of polytrifluorochloroethylene which comprises polymerizing in a polymerization zone and in the presence of a solvent having a higher boiling point than trifluorochloroethylene and a lower boiling point than the polytrifluorochloroethylene produced by the process and in the presence of a promoter, trifluorochloroethylene, prepared by the dechlorination of trichlorotrifluoroethane in a dehalogenation zone in the presence of methyl alcohol, including a recycle fraction prepared as hereinafter described, and in the presence of a metal dehalogenating agent and the removal from said dehalogenation zone of an effluent comprising trifluorochloroethylene, trichlorotrifluoroethane and about 5 to 25 volume per cent of methyl alcohol and purified by the passage of said effluent to a first distillation zone, the recovery from said first distillation zone of a relatively high-boiling recycle fraction comprising methyl alcohol, which is returned to said dehalogenation zone as described above, and a relatively low-boiling fraction comprising trifluorochloroethylene, trichlorotrifluoroethane and about 1 to about 10 volume per cent methyl alcohol, the passage of said relatively low-boiling fraction to a second distillation zone, the recovery from said second distillation zone of a relatively low-boiling fraction comprising trifluorochloroethylene and more than 100 p. p. m. of methyl alcohol, and the water washing of said last named low-boiling fraction to reduce the alcohol content to substantially below 100 p. p. m. to produce a satisfactory monomer for said polymerization zone, removing a reaction mixture from said polymerization zone and separating unreacted trifluorochloroethylene and solvent from the polytrifluorochloroethylene product, passing the thus separated trifluorochloroethylene and solvent to said second distillation zone, recovering from said second distillation zone a relatively high-boiling fraction comprising trichlorotrifluoroethane and solvent used in said polymerization reaction zone, passing said relatively high-boiling fraction from said second distillation zone to a third distillation zone, recovering from said third distillation zone a relatively high-boiling fraction comprising trichlorotrifluoroethane and a relatively low-boiling fraction comprising the solvent used in said polymerization zone and more than 100 p. p. m. of methyl alcohol, water washing said low-boiling fraction from said third distillation zone to reduce the methyl alcohol content below about 100 p. p. m., passing said relatively high-boiling fraction from said third distillation zone to said dehalogenation zone, and returning said relatively low-boiling fraction from said third distillation zone to said polymerization zone.

2. A process for the production of polytrifluorochloroethylene which comprises polymerizing in a polymerization zone trifluorochloroethylene, prepared by the dechlorination of trichlorotrifluoroethane in a dehalogenation zone in the presence of a metal dehalogenating agent and in the presence of a methyl alcohol solvent, including a recycle stream prepared as hereinafter described, and the removal from said dehalogenation zone of an effluent comprising trifluorochloroethylene, trichlorotrifluoroethane and about 5 to 25 volume per cent of methyl alcohol, and purified by the passage of said effluent to a first distillation zone, the recovery from said first distillation zone of a relatively high-boiling recycle fraction comprising methyl alcohol, which is returned to said dehalogenation zone as specified above, and a relatively low-boiling fraction comprising trifluorochloroethylene, trichlorotrifluoroethane and about 1 to about 10 volume per cent methyl alcohol, the passage of said relatively low-boiling fraction to a second distillation zone, the recovery from said second distillation zone of a relatively low-boiling fraction comprising trifluorochloroethylene and more than 100 p. p. m. of methyl alcohol, and the water washing of said last named low-boiling fraction to reduce the methyl alcohol content substantially below 100 p. p. m.

3. A process for the production of polytrifluorochloroethylene which comprises polymerizing in a polymerization zone and in the presence of a solvent having a higher boiling point than trifluorochloroethylene and a lower boiling point than the polytrifluorochloroethylene produced by the process and in the presence of a promoter, trifluorochloroethylene, prepared by the dechlorination of trichlorotrifluoroethane in a dehalogenation zone in the presence of methyl alcohol, including a recycle fraction prepared as hereinafter described, and in the presence of a metal dehalogenating agent, and the removal from said dehalogenation zone of an effluent comprising trifluorochloroethylene, trichlorotrifluoroethane and about 5 to 25 volume per cent of methyl alcohol, and purified by the passage of said effluent to a first distillation zone, the recovery from said first distillation zone of a relatively high-boiling recycle fraction comprising methyl alcohol, which is returned to said dehalogenation zone as described above, and a relatively low-boiling fraction comprising trifluorochloroethylene and more than 100 p. p. m. of methyl alcohol, and the water washing of said low-boiling fraction to reduce the methyl alcohol content substantially below 100 p. p. m. to produce a satisfactory monomer for said polymerization zone, removing a reaction mixture from said polymerization zone and separating unreacted trifluorochloroethylene and solvent from the polytrifluorochloroethylene product, passing the thus separated trifluorochloroethylene and solvent to said first distillation zone, recovering from said first distillation zone a relatively high-boiling fraction comprising trichlorotrifluoroethane and solvent used in said polymerization reaction zone, passing a portion of said relatively high-boiling fraction from said first distillation zone to a second distillation zone, recovering from said second distillation zone a relatively high-boiling fraction comprising trichlorotrifluoroethane and a relatively low-boiling fraction comprising the solvent used in said polymerization zone and more than 100 p. p. m. of methyl alcohol, water washing said low-boiling fraction from said second distillation zone to reduce the methyl alcohol content below about 100 p. p. m., passing said relatively high-boiling fraction from said second distillation zone to said dehalogenation zone, and returning said relatively low-boiling fraction from said second distillation zone to said polymerization zone.

4. A process for the production of polytrifluorochloroethylene which comprises polymerizing in a polymerization zone trifluorochloroethylene, prepared by dechlorination of trichlorotrifluoroethane in a dehalogenation zone in the presence of a metal dehalogenating agent and methyl alcohol as a solvent, and the removal from said dehalogenation zone of an effluent comprising trifluorochloroethylene, trichlorotrifluoroethane and about 5 to 25 volume per cent of methyl alcohol, and purified by the passage of said effluent to a distillation zone, the recovery from said distillation zone of a relatively high-boiling fraction comprising methyl alcohol and a relatively low-boiling fraction comprising trifluorochloroethylene and more than 100 p. p. m. of methyl alcohol, and the water washing of said low-boiling fraction to reduce the methyl alcohol content substantially below 100 p. p. m.

5. A process for the production of polytrifluorochloroethylene which comprises polymerizing in a polymerization zone trifluorochloroethylene, prepared by the dechlorination of trichlorotrifluoroethane in a dehalogenation zone in the presence of methyl alcohol as a solvent, and the removal from said dehalogenation zone of an effluent comprising trifluorochloroethylene and an amount of methyl alcohol in excess of 100 p. p. m., and purified by the washing of said effluent at a temperature between about 25° C. and about 100° C. with a substantial excess of water to reduce the methyl alcohol content of the monomer stream substantially below 100 p. p. m.

6. A process for the production of polytrifluorochloroethylene from a monomer stream containing methyl alcohol as a contaminate in an amount in substantial excess of 100 p. p. m., which comprises polymerizing said monomer in a polymerization zone after purification by washing said stream of monomer at a temperature between about 25° C. and about 100° C. and a pressure between about atmospheric and about 500 pounds per square inch gage, with a substantial excess of water to reduce the methyl alcohol content of said stream substantially below 100 p. p. m.

7. A process for the production of a polymer of trifluorochloroethylene from a trifluorochloroethylene stream containing a normally liquid water soluble oxy compound which is a solvent for trichlorotrifluoroethane as a contaminate, in an amount in substantial excess of 100 p. p. m. which comprises polymerizing the monomer in a polymerization zone after purification by washing said stream of monomer with water to reduce the oxy compound content of said stream substantially below 100 p. p. m.

8. A process for the production of a polymer of trifluorochloroethylene from a trifluorochloroethylene stream containing a normally liquid alcohol which is a solvent for trichlorotrifluoroethane as a contaminate, in an amount in substantial excess of 100 p. p. m. which comprises polymerizing said monomer in a polymerization zone in the substantial absence of a separate aqueous phase after the purification of the monomer stream by washing said stream with water to reduce the alcohol content of said stream substantially below 100 p. p. m.

9. A process for the production of a trifluorochloroethylene product suitable for polymerization from a dehalogenation effluent comprising trifluorochloroethylene, trichlorotrifluoroethane and about 5 to 25 volume per cent of methyl alcohol, prepared by the introduction of trichlorotrifluoroethane and methyl alcohol into a dehalogenation zone, and the dechlorination of said trichlorotrifluoroethane in said dehalogenation zone in the presence of a metal dehalogenating agent, which comprises passing said effluent from said dehalogenation zone to a first distillation zone, recovering from said first distillation zone a relatively high-boiling fraction comprising methyl alcohol and a relatively low-boiling fraction comprising trifluorochloroethylene, trichlorotrifluoroethane and about 1 to about 10 volume per cent methyl alcohol, returning the aforesaid relatively high-boiling fraction comprising methyl alcohol to said dehalogenation zone, passing said relatively low-boiling fraction comprising trifluorochloroethylene, trichlorotrifluoroethane and methyl alcohol to a second distillation zone, recovering from said second distillation zone a relatively low-boiling fraction comprising trifluorochloroethylene and more than 100 p. p. m of methyl alcohol and water washing said low-boiling fraction from said second distillation zone to reduce the methyl alcohol content to substantially below 100 p. p. m.

10. A process for the production of a trifluorochloroethylene product suitable for polymerization from an effluent comprising trifluorochloroethylene and an amount of methyl alcohol in excess of 100 p. p. m. which is prepared by the dechlorination of trichlorotrifluoroethane in the presence of methyl alcohol in a dechlorination zone which comprises washing said effluent at a temperature between about 25° C. and about 100° C. with a substantial excess of water to reduce the methyl alcohol content of the trifluorochloroethylene stream to substantially below 100 p. p. m.

References Cited in the file of this patent

UNITED STATES PATENTS

| | | |
|---|---|---|
| 2,344,061 | Renoll | Mar. 14, 1944 |
| 2,401,897 | Benning | June 11, 1946 |
| 2,478,933 | Bratton | Aug. 16, 1949 |
| 2,480,560 | Downing | Aug. 30, 1949 |
| 2,531,134 | Kropa | Nov. 21, 1950 |
| 2,579,437 | Miller | Dec. 18, 1951 |
| 2,590,433 | Blum | Mar. 25, 1952 |
| 2,628,987 | Ruh | Feb. 17, 1953 |